United States Patent [19]
Thater

[11] 3,858,475
[45] Jan. 7, 1975

[54] CLOTH CUTTING APPARATUS FOR CLOTH REWINDING MACHINE

[75] Inventor: Walter A. Thater, Kirkwood, Mo.

[73] Assignee: The Measuregraph Company, St. Louis, Mo.

[22] Filed: July 19, 1973

[21] Appl. No.: 380,863

[52] U.S. Cl............... 83/471.2, 83/477.2, 83/489, 83/508, 83/508.2, 83/583, 83/614, 83/649
[51] Int. Cl.............................................. B26d 1/18
[58] Field of Search ............ 83/489, 614, 455, 487, 83/488, 649, 471.2, 477.2, 508, 508.2, 583, 582

[56] References Cited
UNITED STATES PATENTS

| | | | |
|---|---|---|---|
| 813,743 | 2/1906 | Scholfield | 83/489 X |
| 1,589,207 | 6/1926 | Miller | 83/489 |
| 1,609,093 | 11/1926 | Miller | 83/614 |
| 2,222,528 | 11/1940 | Chilton | 83/489 X |
| 3,056,325 | 10/1962 | Hart | 83/487 |
| 3,137,192 | 6/1964 | McNeill | 83/455 |
| 3,648,557 | 3/1972 | Lind | 83/489 |
| 3,791,246 | 2/1974 | Lazickas | 83/455 X |

*Primary Examiner*—Frank T. Yost
*Attorney, Agent, or Firm*—Koenig, Senniger, Powers and Leavitt

[57] ABSTRACT

Cloth cutting apparatus adapted for use on a cloth rewinding machine comprising a track secured to the rewinding machine and extending generally horizontally, the track being positioned so that the cloth being rewound passes thereover prior to being wound up into a bolt. The track is constituted by a length of tubing having a slot extending longitudinally thereof with the slot facing the cloth. A carriage having rollers thereon is received in the tube so as to mount the carriage for movement along the track. The cutting apparatus includes a rotary cutting blade and drive means for the cutter blade carried by the carriage, the latter being movable along the track with the cutter blade driven by the drive means to cut the cloth.

9 Claims, 6 Drawing Figures

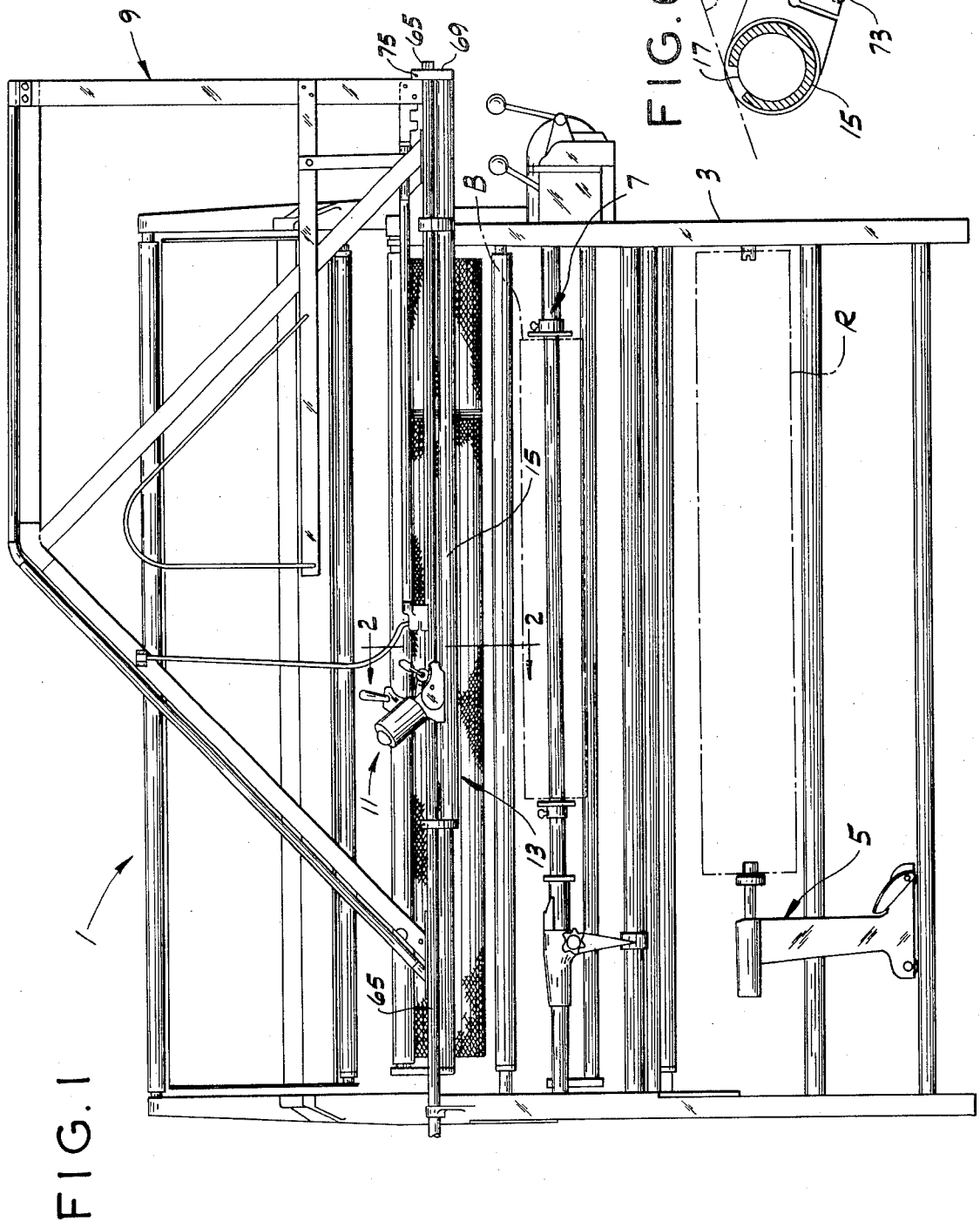
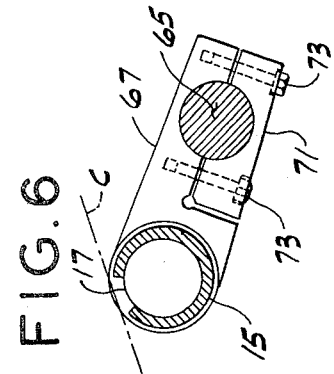

Patented Jan. 7, 1975
3,858,475
2 Sheets-Sheet 2
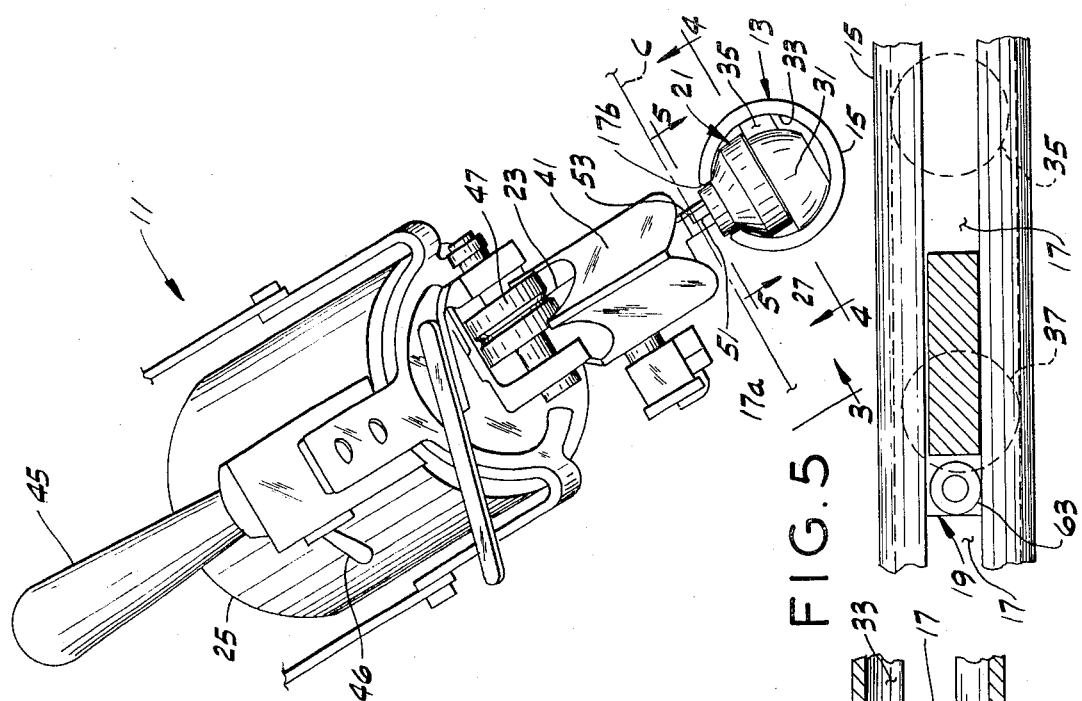
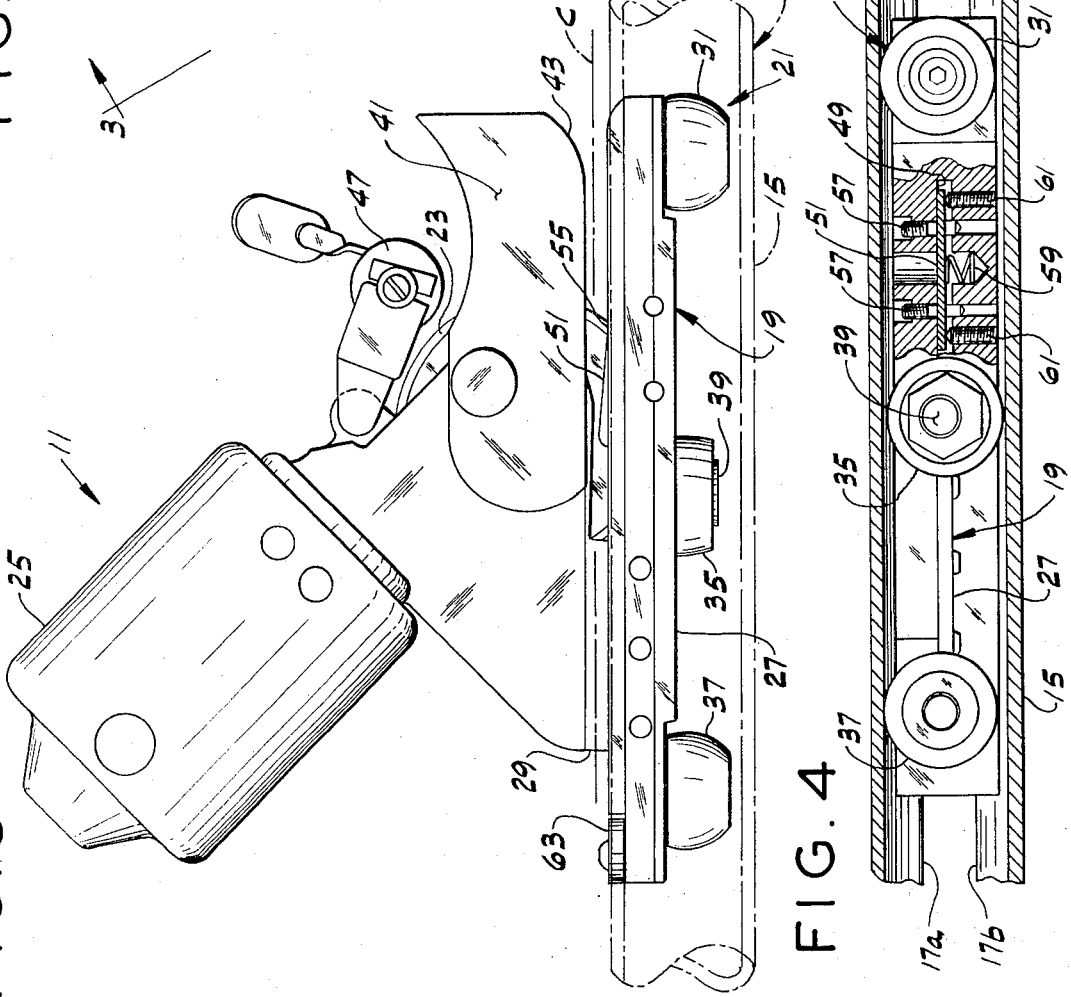

CLOTH CUTTING APPARATUS FOR CLOTH REWINDING MACHINE

BACKGROUND OF THE INVENTION

This invention relates to cloth cutting apparatus for use on a cloth rewinding machine to sever cloth which has been unwound from a bulk roll and rewound on a core to form a bolt of cloth having a convenient length of cloth (e.g., 10–15 yards) for sale in retail stores.

In the past, the cloth being wound into a bolt has been cut from the bulk roll by the operator with a pair of scissors, a knife or electric scissors. This manual cutting operation is relatively slow and oftentimes the cut end of the cloth is crooked and uneven, thus resulting in waste of cloth and an unattractive appearance when the new bolt is displayed for sale.

SUMMARY OF THE INVENTION

Among the several objects of this invention may be noted the provision of cloth cutting apparatus for use on a cloth rewinding machine, the cutter apparatus being operable quickly and neatly to sever the cloth; the provision of such a cutter which may be removed from the rewinding machine; the provision of such a cutter which does not interfere with the operation of the rewinding machine; the provision of such a cutter which is safe to use; and the provision of such a cutter which is of economical and rugged construction. Other objects and features of this invention will be in part apparent and in part pointed out hereinafter.

Briefly, a cloth cutting apparatus of this invention is primarily adapted for use on a cloth rewinding machine which has a frame, means for supporting a bulk roll of cloth on the frame and means for winding cloth from the roll into a bolt. The cutter apparatus comprises a track adapted to be secured to the rewinding machine extending generally parallel to the longitudinal axis of the bolt and being positioned so that the cloth passes by the track prior to being wound up in the bolt. The track is a length of tubing having a slot extending longitudinally thereof with the slot facing the cloth. A carriage having roller means is received in the tube so as to mount the carriage for movement along the track. A rotary cutting blade and drive means for driving the cutter blade are provided and the carriage is movable along the track with the cutter blade driven by the cutter drive means to cut the cloth.

BRIEF DESCRIPTION OF THE DRAWINGS

FIG. 1 is a front elevational view of a cloth rewinding machine having cloth cutter apparatus of this invention installed thereon;

FIG. 2 is an enlarged vertical section on line 2—2 of FIG. 1 showing the cutter apparatus as it is mounted on a track in front end elevation;

FIG. 3 is a view on line 3—3 of FIG. 2 showing the cutter assembly in side elevation, the track being shown in phantom;

FIG. 4 is a section taken on line 4—4 of FIG. 2;

FIG. 5 is a section taken on line 5—5 of FIG. 2; and

FIG. 6 is a section taken on line 6—6 of FIG. 1.

corresponding reference characters indicate corresponding parts throughout the several views of the drawings.

DESCRIPTION OF THE PREFERRED EMBODIMENT

Referring now to the drawings, a cloth rewinding machine is indicated in its entirety at 1. This machine has a main frame 3, a holder 5 for supporting bulk roll R of cloth C, and means generally indicated at 7 for winding cloth from the bulk roll onto a core (not shown) to form a bolt B. The rewinding machine further comprises a centerfolding frame 9 for centerfolding the cloth unwinding from the bulk roll and prior to its being wound up on the core to form bolt B. As generally indicated at 11, a cutter apparatus of this invention is removably secured to the rewinding machine, this cutter being operable to cut the cloth (whether centerfolded or not) after a desired length of cloth has been wound up in bolt B.

More particularly, cutter apparatus 11 comprises a track 13 removably secured to rewinding machine 1 extending generally parallel to the longitudinal axis of bolt B and positioned on the machine so that the cloth passes by the track (see FIGS. 2 and 6). Track 13 is shown to be a length of tubing 15 of circular cross section having a slot or split 17 extending longitudinally thereof with the slot facing the cloth C. The edges of the slot are indicated at 17a, 17b. A carriage 19 having rollers, generally indicated at 21, is received within the tube for mounting the carriage on the track for movement therealong. The apparatus further includes a rotary circular cutter blade 23 and an electric motor 25 for driving the cutter blade. The carriage may be moved in one direction (e.g., from left to right as viewed in FIG. 1) along track 13 with the cutter blade driven by motor 25 to cut cloth C.

Carriage 19 is shown to comprise a main body portion 27 disposed within tube 15 and a bracket portion 29 extending outwardly of the tube through slot 17 for supporting cutter blade 23 and motor 25. Rollers 21 are journalled on the body 27 of the carriage for rolling on the inside surface of the tube as the carriage is moved therealong. As best shown in FIGS. 3 and 4, a first or front roller 31 is journalled on the bottom of the forward end of the lower portion of the carriage so as to be in rolling contact with the inner surface 33 of the tube on one side thereof. A center or second roller 35 journalled on the carriage intermediate the ends thereof is in rolling contact with the inner surface of the tube on the side of the tube opposite from roller 31. A rear or third roller 37 is journalled at the rear end of the carriage in rolling contact with the inside surface of the tube on the same side of the tube as roller 31. Center roller 35 is secured to the carriage by means of an eccentric mounting 39, the mounting being adjustably rotatable to move the center roller in and out relative to the carriage thereby to adjust the position of the center roller for maintaining rolling contact with the inner surface 33 of tube 15 when the nonadjustable rollers 31 and 37 are in rolling contact with the inner surface of the tube on the side opposite from roller 35. This adjustable roller arrangement provides the capability of maintaining the rollers in rolling contact with the inner surface 33 of the tube and to accommodate changes in internal cross section of the tube. Each roller 31, 35 and 37 is journalled on the carriage by means of ball bearings (not shown) to provide ease of movement of the carriage along the track. As best shown in FIG. 2, the rollers are part spherical for line contact with the internal surface 33 of the tube thereby more solidly to support the carriage as it rolls along the track. With the rollers in contact with opposite sides of the inner surface of the tube, the cutter is substantially prevented from rocking side to side relative to the track.

The bracket 29 of carriage 21 extends outwardly from the first portion 27 between edges 17a,17b of slot 17. This bracket journals cutter blade 23 on an axis generally perpendicular to the longitudinal axis of track 13, mounts motor 25 and houses a drive train (not shown) interconnecting the motor and the cutter blade. A safety guard 41 secured to the bracket encloses the front portion of the cutter blade. This guard extends forwardly of the blade, is spaced clear of tube 15 a distance sufficient to accommodate several layers of cloth C so as to provide clearance for the cloth between the inner edge of the guard and the tube as the cutter is moved along the track to cut the cloth. The forward end of the guard is upturned, as indicated at 43, to guide the cloth down toward the track as the cutter is moved from a position clear of the edge of the cloth to begin cutting the cloth. A handle 45 is provided to enable the operator readily to grip the cutter and to move it along the track. Motor 25 may be energized and deenergized by a toggle switch 46. A sharpening stone 47 is pivotally supported from the bracket 29 of the carriage and is selectively movable into engagement with the peripheral edge of the cutter blade as the blade is rotating for sharpening the blade.

As shown in FIG. 3, cutter blade 23 extends down between the edges 17a,17b of slot 17 in tube 15 and is received within a slot 49 in body 27 of carriage 19. A shear blade 51 having a carbide shearing edge 53 is adjustably and resiliently carried by the carriage in slot 49 for engagement with the rotary cutting blade at a shear point, so indicated at 55 in FIG. 3, thereby to shear cloth C as the cutter is moved forwardly along track 13. Shear blade 51 is slidably supported on pins 57 threadably carried by the carriage. A compression coil spring 59 interposed between the carriage and the shear blade resiliently holds the shear blade against the adjacent face of rotary cutting blade 23 (see FIG. 2). Set screws 61 are provided so as to selectively position the shear blade relative to the cutter blade. Thus, the shear blade may be adjusted so as to cock it with respect to the plane of cutter blade 23 for point contact of the peripheral carbide cutting edge 53 of the shear blade with the cutter blade 23.

As shown in FIGS. 3 and 5, a fourth or side thrust roller 63 is journalled on the first portion of the carriage 21 at the trailing end or rear end thereof. This side thrust roller is disposed between the edges 17a,17b of slot 17 for rolling contact with one edge of the slot or the other so as to limit the side-to-side movement of the cutter relative to tube 15.

As shown in FIG. 1, centerfolding frame 9 includes a mounting support 65 extending generally horizontally of the rewinding machine 1 from one side thereof to the other. Split tube 15 is removably secured to support 65 by means of brackets 67 and 69 rigidly secured to the ends of the tube. Bracket 67 (at the left end of the tube as viewed in FIG. 1) is shown to be a clamp with a removable cap 71 surrounding support 65, the cap being removably secured to the bracket by bolts 73. The right end of the tube is secured to the support by bracket 69. This last-mentioned bracket is a split clamp adapted to receive supports 65. A bolt 75 is provided to releasably clamp the bracket on the support. By loosening brackets 67 and 69 relative to the support, the brackets and tube 15 may be swung or pivoted about the longitudinal axis of support 65. As the brackets and the tube are so swung, the direction in which slot 17 in the tube faces may be varied. It is desirable that slot 17 face the cloth and that the plane of cutter blade 23 is generally perpendicular to the plane of the cloth. If bolts B of varying cross sections are to be rewound, the plane of the cloth with respect to the horizontal may vary. By unclamping brackets 67 and 69 from support 65 and pivoting them about the support, the plane of the cutter blade may be maintained perpendicular to the cloth. It will be understood that when the cutter of this invention is not in use, cap 71 of bracket 67 may be removed thereby to release the left end of the tubing from support 65. Bolt 75 in bracket 69 may then be backed off and the bracket slid clear of the end of support 65 thereby to remove the cutter assembly from the rewinding machine.

In operation of the rewinding machine, the carriage is positioned at the left end of track 13 (as viewed in FIG. 1) clear of the edge of the cloth C being wound on bolt B. After a desired length of cloth has been wound on the bolt, the winding machine is stopped and the operator energizes motor 25 by throwing switch 46. The operator then grasps handle 45 and rapidly moves the cutter assembly along track 13 on rollers 31, 35 and 37 to the right (as viewed in FIG. 1). As the upturned end 43 of guard 41 moves over the edge of cloth C, the cloth is guided toward cutting blade 23. Upon further movement of the cutter, the cloth is sheared between the rotary cutting blade 23 and the stationary shear blade 53. Upon completion of the cut, the operator returns the cutter to its starting position.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. cloth cutting apparatus adapted for use on a cloth rewinding machine, said machine having a frame, means for supporting a bulk roll of cloth, and means for winding cloth from the roll into a bolt; said cutter apparatus comprising a track adapted to be secured to said rewinding machine extending generally parallel to the longitudinal axis of said bolt and being positioned so that the cloth passes by the track prior to being wound up in said bolt, said track comprising a length of tubing having a slot extending longitudinally thereof with said slot facing said cloth, a carriage having roller means adapted to be received in the tube so as to mount the carriage for movement along the track, a rotary cutting blade, drive means for driving the cutter blade, said carriage being movable along the track with said cutter blade driven by said cutter drive means to cut the cloth, said carriage comprising a body portion adapted to be disposed within said tube and a bracket portion extending outwardly of tht tube through said slot for supporting said cutter blade and said cutter drive means, and a plurality of rollers journalled on said body portion of said carriage for rolling on the inside surface of said tube as said carriage is moved along the tube, said plurality of rollers including a first roller in rolling contact with the inner surface of the tube on one side thereof, a second roller in rolling contact with the inner surface of the tube on the opposite side thereof from said one side, and a third roller in rolling contact with the inside surface of the tube on said one side, whereby with said first and third rollers and said second roller in rolling contact with generally opposite sides of the tube, said carriage is effectively prevented from rocking side-to-side relative to the tube as the carriage is moved longitudinally along the track.

2. Apparatus as set forth in claim 1, wherein said track is a split tube of generally circular cross section.

3. Apparatus as set forth in claim 1, wherein said second roller is adjustably movable relative to the first and third rollers so as to accommodate variations in the internal cross section of said tube.

4. Cloth cutting apparatus adapted for use on a cloth rewinding machine, said machine having a frame, means for supporting a bulk roll of cloth, and means for winding cloth from the roll into a bolt; said cutter apparatus comprising a track adapted to be secured to said rewinding machine extending generally parallel to the longitudinal axis of said bolt and being positioned so that the cloth passes by the track prior to being wound up in said bolt, said track comprising a length of tubing having a slot extending longitudinally thereof with said slot facing said cloth, a carriage having roller means adapted to be received in the tube so as to mount the carriage for movement along the track, a rotary cutting blade, drive means for driving the cutter blade, said carriage being movable along the track with said cutter blade driven by said cutter drive means to cut the cloth, said carriage comprising a body portion adapted to be disposed within said tube and a bracket portion extending outwardly of the tube through said slot for supporting said cutter blade and said cutter drive means, and a plurality of rollers journalled on said body portion of said carriage for rolling on the inside surface of said tube as said carriage is moved along the tube, said plurality of rollers including a side thrust roller journalled on said body portion of the carriage for rolling contact with one edge or the other of said slot in said tube so as to limit side-to-side movement of said cutter relative to said tube.

5. Apparatus as set forth in claim 4, wherein said side thrust roller is located at one end of said body portion of said carriage constituting the trailing end of the carriage.

6. Cloth cutting apparatus adapted for use on a cloth rewinding machine, said machine having a frame, means for supporting a bulk roll of cloth, and means for winding cloth from the roll into a bolt; said cutter apparatus comprising a track adapted to be secured to said rewinding machine extending generally parallel to the longitudinal axis of said bolt and being positioned so that the cloth passes by the track prior to being wound up in said bolt, said track comprising a length of tubing having a slot extending longitudinally thereof with said slot facing said cloth, a carriage having roller means adapted to be received in the tube so as to mount the carriage for movement along the track, a rotary cutting blade, drive means for driving the cutter blade, said carriage being movable along the track with said cutter blade driven by said cutter drive means to cut the cloth, wherein the angle of the cloth relative to the horizontal as it passes by said track may vary depending on the cross section of the bolt being wound, and wherein said track is adjustably movable relative to the cloth so as to position the track at a predetermined position relative to the cloth to adjust the angle of the cutter blade relative to the cloth thereby to maintain the cutter blade generally perpendicular to the cloth.

7. Cloth cutting apparatus adapted for use on a cloth rewinding machine, said machine having a frame, means for supporting a bulk roll of cloth,, and means for winding cloth from the roll into a bolt; said cutter apparatus comprising a track adapted to be secured to said rewinding machine extending generally parallel to the longitudinal axis of said bolt and being positioned so that the cloth passes by the track prior to being wound up in said bolt, said track comprising a length of tubing having a slot extending longitudinally thereof with said slot facing said cloth, a carriage having roller means adapted to be received in the tube so as to mount the carriage for movement along the track, a rotary cutting blade, drive means for dirving the cutter blade, said carriage being movable along the track with said cutter blade driven by said cutter drive means to cut the cloth, said carriage comprising a body portion adapted to be disposed within said tube and a bracket portion extending outwardly of the tube through said slot for supporting said cutter blade and said cutter drive means, and a plurality of rollers journalled on said body portion of said carriage for rolling on the inside surface of said tube as said carriage is moved along the tube, wherein a portion of said cutter blade extends into said tube between the edges of said slot, and wherein said body portion of the carriage has a slot therein for reception of said cutter blade, said carriage slot having a shear blade mounted therein for contact with the periphery of the cutting blade for shearing the cloth.

8. Apparatus as set forth in claim 7, wherein said shear blade is adjustably mounted within the carriage slot for varying the angle of the shear blade relative to the cutter blade.

9. Apparatus as set forth in claim 7, wherein said carriage includes spring means for resiliently biasing said shear blade into engagement with said cutter blade.

* * * * *